United States Patent [19]
Subieta

[11] 3,787,626

[45] Jan. 22, 1974

[54] SYSTEM FOR AUTOMATIC IDENTIFICATION OF CALLING PARTY'S TELEPHONE NUMBER TO RECEIVING PARTY

[76] Inventor: Carlos Subieta, 11000 Newpor Mill Rd., Kensington, Md. 20795

[22] Filed: Apr. 23, 1971

[21] Appl. No.: 136,810

[52] U.S. Cl. ......... 179/5.5, 179/18 FH, 179/27 DB, 179/84 VF, 179/90 AN

[51] Int. Cl. ........................................... H04m 15/06

[58] Field of Search 179/5.5, 84 VF, 18 FH, 27 DB, 179/27 FC, 27 FF, 90 AN; 340/336

[56] References Cited

UNITED STATES PATENTS

| | | | |
|---|---|---|---|
| 3,133,153 | 5/1964 | Bonanno | 179/27 FF |
| 3,576,951 | 5/1971 | Uchida | 179/27 DB |
| 2,040,646 | 5/1936 | Erickson | 179/90 AN |
| 3,582,554 | 6/1971 | LeBlang | 179/84 VF |
| 3,686,440 | 8/1972 | Kroeger | 179/5.5 |

FOREIGN PATENTS OR APPLICATIONS

| | | | |
|---|---|---|---|
| 1,170,331 | 11/1969 | Great Britain | 179/5.5 |

*Primary Examiner*—William C. Cooper
*Assistant Examiner*—David L. Stewart
*Attorney, Agent, or Firm*—Mason, Fenwick & Lawrence

[57] ABSTRACT

An automatic system for displaying the calling party's telephone number at the telephone set of the called party when the circuit therebetween is initiated, including apparatus associated with each telephone subscriber's lines activated automatically responsive to signals indicating connection with the called telephone to generate pulse trains signifying the telephone number of the calling party. Readout display devices and pulse receiver equipment at the called telephone respond to the pulse trains to display the telephone number signified thereby.

11 Claims, 10 Drawing Figures

INVENTOR
CARLOS SUBIETA
BY
Mason, Fenwick & Lawrence
ATTORNEYS

INVENTOR

CARLOS SUBIETA

BY
Mason, Fenwick & Lawrence
ATTORNEYS

PATENTED JAN 22 1974 3,787,626

SHEET 3 OF 5

INVENTOR

CARLOS SUBIETA

BY
Mason, Fenwick & Lawrence
ATTORNEYS

INVENTOR

CARLOS SUBIETA

BY
Mason, Fenwick, & Lawrence
ATTORNEYS

INVENTOR

CARLOS SUBIETA

BY
Mason, Fenwick & Lawrence
ATTORNEYS

SYSTEM FOR AUTOMATIC IDENTIFICATION OF CALLING PARTY'S TELEPHONE NUMBER TO RECEIVING PARTY

BACKGROUND AND OBJECTS OF THE INVENTION

The present invention relates in general to apparatus including receiver and transmitter portions for each subscriber in a telephone system, the receiver portion to be associated with each telephone set and the transmitter portion to be associated with the subscriber's telephone line for automatically indicating at the telephone set of a called party the telephone number of the calling party.

Anonymous telephone calls for the purpose of issuing threats or warnings, or directing obscene language, to a called party or called telephone number have become matters of serious public concern. Unless the calling party can be kept on the telephone line for a considerable period of time, it has been difficult to trace the source of the call by usual call tracing methods. The provision of a system wherein the telephone number of the calling party is automatically identified to the called party as soon as the ring circuit of the called telephone is activated would have many obvious advantages, as it would permit the called party to identify or record the number of the calling telephone before the called party even lifts the telephone receiver off of the cradle. Thus the called party can exercise an option as to whether or not to answer the telephone, depending upon whether the called party does or does not recognize the particular number of the calling telephone. The number of the calling party remains on display at the called telephone set until another incoming call occurs.

An object of the present invention, therefore, is the provision of a system or apparatus to be associated with a telephone system, which permits the identification to the called party, in a totally automatic manner, of the telephone number of the calling party.

Another object of the present invention is the provision of a novel system as described in the preceding paragraph, wherein the identification of the calling number to the called party occurs before the called telephone receiver is lifted from the cradle, thus providing the called party the opportunity of answering or not answering a particular call.

Another object of the present invention is the provision in a telephone system of novel apparatus for automatically identifying to the called party the telephone number of the calling party before communication is established, to thereby eliminate or discourage illegal anonymous telephone calls.

Other objects, advantages and capabilities of the present invention will become apparent from the following detailed description, taken in conjunction with the accompanying drawings illustrating a preferred embodiment of the invention.

The apparatus of the present invention, in general, comprises a transmitter unit associated with a particular telephone subscriber, which may be protected by suitable security methods to avoid tampering, or may be located at a normally non-accessible location along the subscriber's telephone line or at the central station, having means for automatically emitting a pulse train of audio frequency signals lasting only a few microseconds which distinctively identifies the telephone number of the calling party, as soon as the lines between the calling and called parties are established. Each telephone set in the system also includes a receiver unit which responds to the pulse train emitted by the transmitting unit and produces a display at or in the called party's telephone set identifying the telephone number signified by the pulse train. This is accomplished as soon as the ring circuit to the called telephone is established, before the called party lifts the telephone receiver from its cradle, and thus affords the called party an opportunity to elect whether or not to answer the telephone call. Also, if the called party answers the call and it turns out to be an anonymous threat or obscene call, the number of the calling telephone can be jotted down or more easily remembered because it is visually displayed at the telephone receiver itself.

BRIEF DESCRIPTION OF THE FIGURES

FIG. 5A is a vertical section view through the readout cylinder and associated coil assembly;

FIG. 5B is a vertical section view showing the coil arrangement of the coil assembly of one of the readout cylinders, taken along the line 5B—5B of FIG. 5A;

DETAILED DESCRIPTION OF A PREFERRED EMBODIMENT

Figure 1:
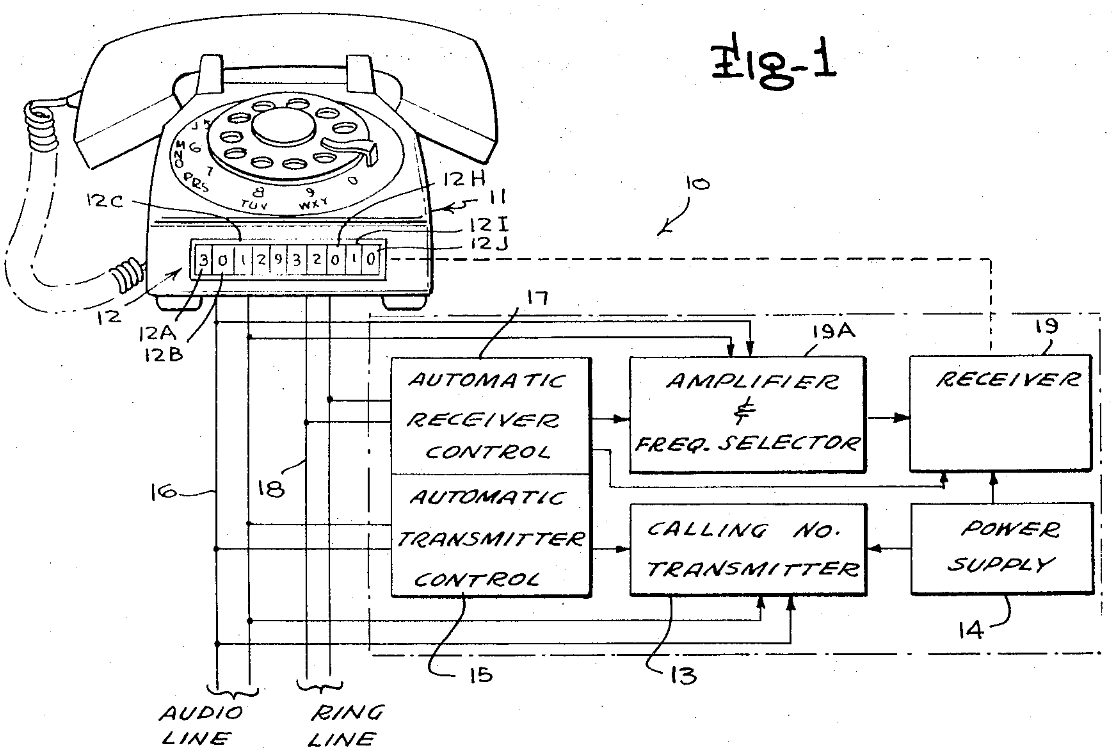
FIG. 1 is a diagrammatic view showing one telephone set and a block diagram illustration of the basic components of the calling party identifying system of the present invention.

Referring now to the drawings, wherein like reference characters designate corresponding parts throughout the several figures, the automatic calling number system of the present invention, generally indicated at the reference character 10 in FIG. 1, is designed to be associated with a telephone set, indicated generally by reference character 11, which has been modified to provide a plurality of readout number indicators generally indicated at 12, which in the described example will be capable of indicating 10 numeral digits corresponding to the three digit area code and the seven digit number assigned to telephone subscriber. Each automatic calling number identifying unit 10 may be described generally as including a calling number transmitter circuit 13 coupled to a power supply 14 and controlled by an automatic transmitter control 15 which is connected to the audio lines 16 of the associated telephone set 11. The system 10 also includes an automatic receiver control 17 which is coupled to the ring lines 18 of the associated telephone set 11 and to an amplifier and frequency selector 19A and a receiver unit 19 which drives the readout indicators 12.

Figure 8:
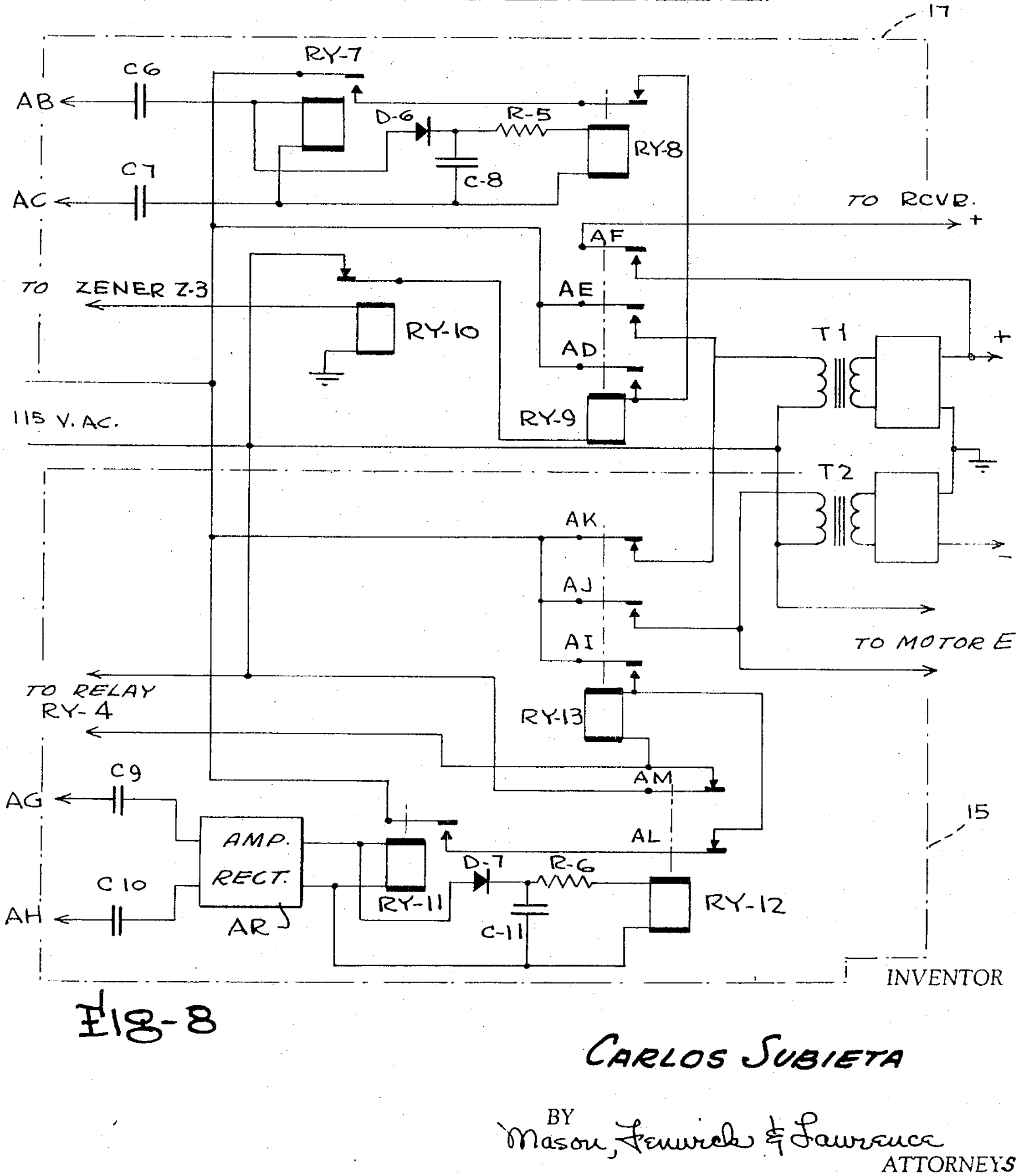
FIG. 8 is a schematic diagram of the automatic receiver control and automatic transmitter control unit.

The automatic transmitter control 15 and automatic receiver control 17 are shown schematically, for convenience, in FIG. 8, although it will be understood that the automatic receiver control portion 17 will usually be directly associated with the telephone set 11, and the automatic transmitter control 15 will be located at some secure location, such as on the telephone pole connected to the subscriber's lines or if desired at a central telephone station or sub-station.

When a telephone subscriber lifts the telephone hand set from the cradle and dials a number, the audio signal imposed on the audio lines 16 to the calling party's telephone set while the ringing device on the called party's set is being operated, activates the automatic transmitter control 15 associated with the calling party's set to commence cycling of the calling party's transmitter which then imposes on the line a series of pulse trains signifying the number of the calling party. Signals on the ring line leading to the telephone set of the called party activate the automatic receiver control 17 associated with the called party's set, arming the receiver 19 and applying signals thereto from the amplifier and frequency selector 19A in accordance with the pulse train received at the called party's set to position the readout indicators 12 to identify the telephone number of the calling party.

Figure 2:
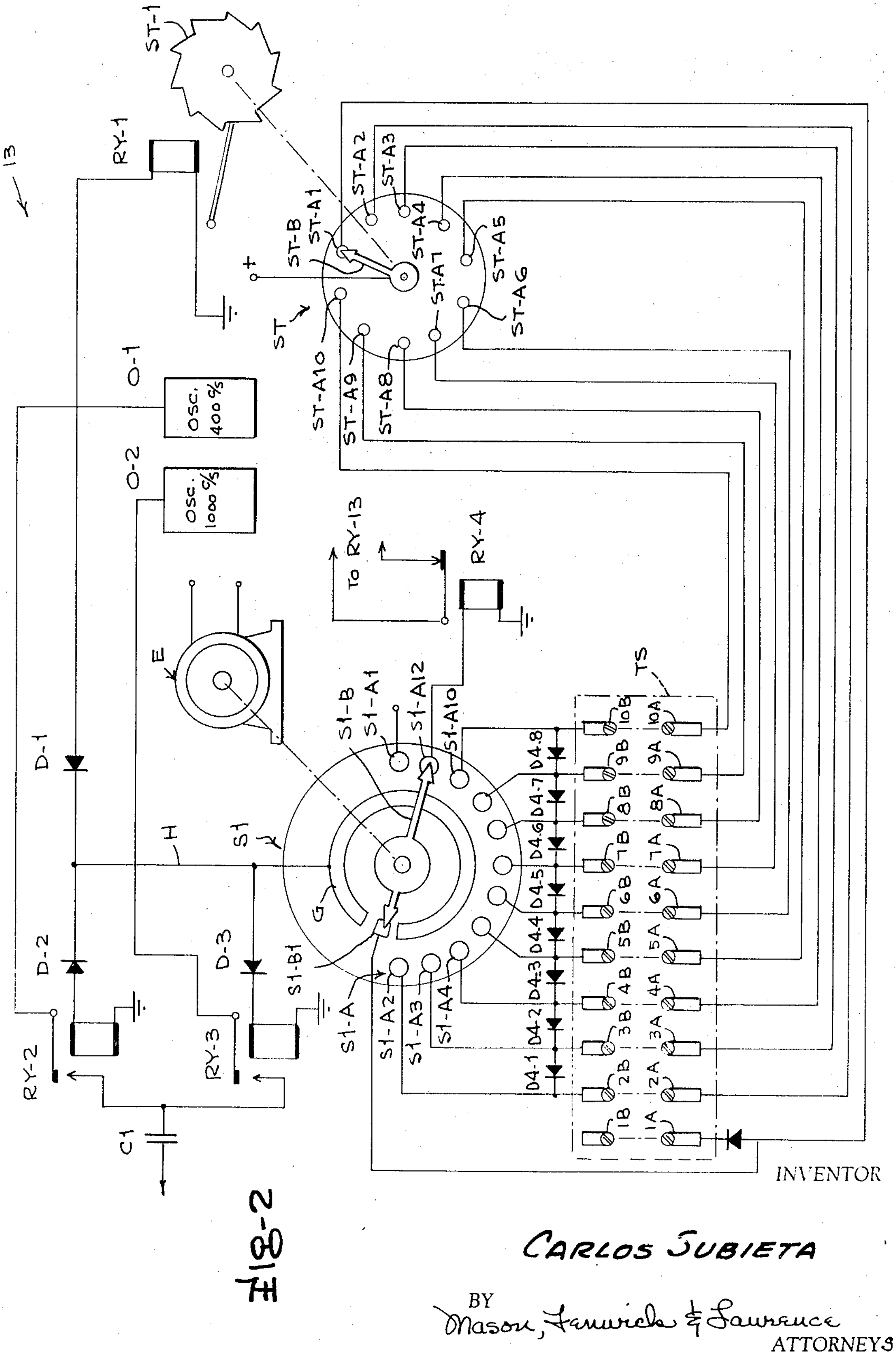
FIG. 2 is a schematic diagram of the calling number transmitting circuit.

Referring specifically to FIG. 2 illustrating the schematic circuit of the calling number transmitter 13, a stepping switch ST having 10 stationary contact buttons, indicated generally at ST–A, and a rotating contact arm or brush ST–B, is activated by the ratchet ST–1 advanced in stepwise fashion by solenoid RY–1, forming a stepping relay switch assembly. The ratchet ST–1 is connected to the rotating contact brush ST–B by means of a shaft, indicated by broken lines, on which the brush ST–B is mounted with a bushing which insulates it from its shaft. As illustrated in FIG. 2, the brush ST–B is normally located on the first stationary contact button ST–A1, and rotates clockwise from this position establishing contact at each successive step with buttons ST–A2, ST–A3, etc., to the tenth stationary contact button and then returns once again to the first stationary contact button ST–A1 at the position shown in FIG. 2. Connections from the ten stationary contacts of the stepping relay switch ST lead to a terminal strip TS and are connected to the lower series of screw type terminals TS–1A to TS–10A as shown. Facing the lower row of terminals is an upper row of 10 screw type terminals indicated at TS–1B to TS–10B, which may be cross connected with any of the screw type terminals TS–1A to TS–10A in accordance with the area code and telephone number of the telephone set or subscriber with which the calling number transmitter 13 is associated. The terminals TS–2B to TS–10B are interconnected with diodes D4–1 to D4–8, as shown in FIG. 2, and are also connected to stationary contacts S1–A of the rotary switch S1. The rotary switch S1 has a movable brush contact S1–B insulated from and mounted on a shaft to be driven by the electric motor E, as indicated by broken lines in FIG. 2. The movable brush contact S1–B includes a long arm and a short arm extending diametrically oppositely from the center shaft, to make simultaneous contact with one of the stationary contacts indicated generally at S1–A in FIG. 2 and also with the center contact ring G. The long hand of the brush contact S1–B makes contact with the outer series of stationary contacts S1–A, while the short arm of the brush S1–B makes contact with the center ring G, or with inner contact button S1–B1.

Figure 3:
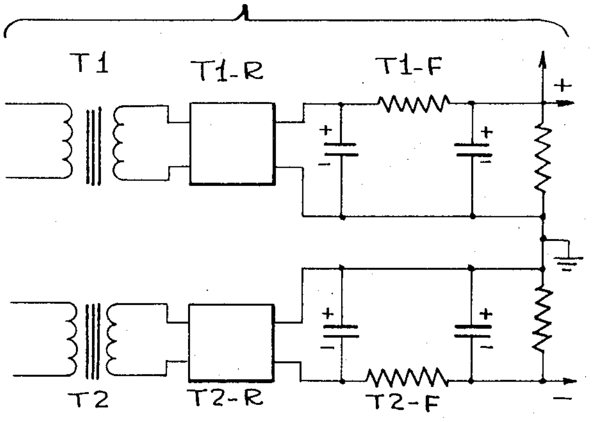
FIG. 3 is a schematic diagram of the power supply for the circuit of FIG. 2.

The power supply for the circuit shown in FIG. 2 is illustrated in FIG. 3, and consists of two independent transformers T1 and T2 with associated rectifiers T1–R and T2–R and filter circuits T1–F and T2–F as illustrated. The first power supply associated with transformer T1 has the positive side of its output insulated and the negative side connected to the chassis or to ground, and the second power supply portion associated with transformer T2 has the negative side of its outlet insulated and its positive side connected to the chassis or to ground. The positive terminal of the power supply is connected to the movable contact brush ST–B of the stepping relay ST and the negative terminal of the power supply is connected to the first terminal S1–A1 of the rotary switch S1.

The center ring G is connected through diode D1 to the coil of relay solenoid RY–1 and through diode D2 to the coil of relay RY–2, and also through diode D3 to the coil of relay RY–3. The movable contact of relay RY–2 is connected to the output of a 400 cycle per second oscillator 0–1 and the armature of relay RY–3 is connected to the output of a 1,000 cycle per second oscillator 0–2, while the stationary contacts of both of these relays are connected through capacitor C1 to the telephone line 16. The 1,000 cycle per second oscillator 0–2 generates a pulse of 1,000 cycle per second oscillations corresponding to units, while the oscillator 0–1 generates pulses of 400 cycle per second oscillations each of which corresponds to a series of 10.

Describing briefly the operation of the circuit of calling number transmitter 13 shown in FIG. 2, and assuming the terminals 1–A through 10–A of the terminal strip TS are connected respectively with the upper terminals 1–B through 10–B, the motor E is energized, as later described, by the automatic transmitter control 15 and produces a first cycle of revolution of the rotary switch brush S1–B from the standing position illustrated in FIG. 2. During the first revolution of the brush S1–B, no positive pulses will be produced on the line H, connected to the contact ring G, when the upper and lower rows of terminals of the terminal strip TS are interconnected as shown, but a negative pulse will be produced on line H when the brush engages the negative stationary contact button S1–A1 of the switch S–1. This negative pulse will pass through the coils of relays RY–1 and RY–2 due to the conduction through the diodes D1 and D2 connected to the line H. The application of the negative pulse through diode D2 to the coil of relay RY–2 closes its relay contact and applies to the telephone line through the capacitor C1 a pulse of 400 cycles per second from the oscillator 0–1. Concurrently, the application of the negative pulse through diode D1 to the coil of relay RY–1 energizes the latter relay to cause the rotary brush ST–B of the stepping switch ST to advance one step, placing the brush ST–B in contact with the second stationary contact button ST–A2. The second revolution of the rotary switch brush S1–B causes a positive pulse to appear on the line H when the brush S1–B makes contact with the button S1–A2 connected to the terminal TS–2B of the terminal strip. This positive pulse derived from the stationary contact button ST–A2, terminal strip terminals TS–2A and TS–2B, and stationary contact button S1–A2 of rotary switch S1 is applied through diode D3 to the coil of relay RY–3, closing its contact arm and applying a pulse of 1,000 cycles per second from the oscillator 0–2 through the capacitor C1 to the telephone line. When the rotary brush S1–B then makes contact with the negative terminal S1–A1, the negative pulse is again supplied through the diodes D2 and D1 to the relay RY–2 to apply a 400 cycle per second pulse from the oscillator 0–1 to the telephone line and to energize relay RY–1 to advance the rotary contact brush ST–B another step to contact stationary contact button ST–A3.

On the third revolution of the rotary switch brush S1–B, two positive pulses will be produced, when the terminals S1–A3 and S1–A2 are engaged by the rotary brush S1–B, because the contact button S1–A3 is connected to positive through the contact button ST–A3 of the switch ST, and the contact button S1–A2 is connected to positive through the diode D4–1 connecting the latter to the terminal TS–3B of the terminal strip. Thus, two pulses of 1,000 cycles per second will be applied to the telephone line through capacitor C1, followed by one pulse of 400 cycles per second, and the stepping relay ST will then be advanced one more step, placing the brush ST–B in contact with the fourth contact button ST–A4.

Figure 4:
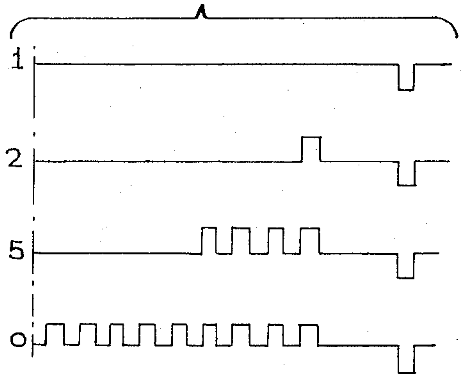
FIG. 4 is a set of pulse train waveforms illustrating the types of pulse trains produced by the transmitter circuit of FIG. 2 to identify digits of the calling number.

It will be apparent that in a similar manner the fourth through the tenth stationary contact buttons of the switch ST, when they are engaged by the stepping relay contact brush ST–B to which the positive voltage is applied, will cause positive pulses to be applied to the line H and to the diode D3 to energize relay RY–3 and cause a number of 1,000 cycle per second positive pulses to be applied to the telephone line equal to the number of the stationary contact buttons ST–A4 to ST–A10, minus one, assuming the terminals TS–1A to TS–10A are connected to the correspondingly numbered upper terminals TS–1B to TS–10B. FIG. 4 illustrates representative pulse trains, assuming such connections of the terminal strip TS, when the stepping relay brush ST–B engages respectively the stationary contact buttons ST–A1, ST–A2, ST–A5, and ST–A10. It will be appreciated that the positive pulses are applied to the line as pulse envelopes with frequencies of 1,000 cycle per second obtained from the oscillator 0–2, followed by a single negative pulse envelope of a frequency at 400 cycles per second obtained from the oscillator 0–1.

When the stepping relay brush ST–B reaches the tenth position engaging the stationary contact button ST–A10, which corresponds to the digit 0, the rotary switch brush S1–B, following production of the train of nine positive pulses, applies the negative voltage from contact button S1–A1 to the line H to activate relay RY–2 and generate the negative pulse of 400 cycle per second frequency and concurrently activates the stepping relay coil RY–1 to advance the stepping relay brush ST–B to again engage the contact button ST–A1. The longer arm of the rotary switch brush S1–B then engages the stationary contact button S1–A12 which applies positive voltage to the coil of relay RY–4 which interrupts the supply circuit to the motor E and thus turns off the entire system. It will be apparent, therefore, that once the motor E is energized by the automatic transmitter control 15 responsive to the audio ringing signals on the audio line 16 of the calling telephone set 11 produced when the buzzer of the called telephone set is being rung, the motor E continues to operate and rotates the rotary switch brush S1–B through ten cycles of revolution before the motor E is again deenergized, to automatically apply to the audio line 16 from the calling number transmitter 13 ten sets of signals each concluding with the negative 400 cycle per second pulse produced by the oscillator 0–1 indicative of the telephone number of the calling telephone set.

The telephone number which would be signaled by the calling number transmitter 13 with the circuit connections as shown in FIG. 2 would be 123 456 7890. It will be appreciated that the connections between the lower row and the upper row of terminals of the terminal strip TS of the calling number transmitter 13 associated with each telephone set will be changed to properly correspond to the area code and telephone number of the associated telephone set. For example, if the area code for the telephone set is area code 202, the first and third lower terminals TS–1A and TS–3A would be connected to the second upper terminal TS–2B and the second lower terminal TS–2A would be connected to the tenth upper terminal TS–10B. Thus, on the first revolution of the rotary switch brush S1–B upon energizing of the motor E to initiate a transmitting cycle, the positive voltage applied to stationary button ST–A1 of the stepping relay switch would be applied through terminal TS–1A and terminal TS–2B to stationary contact button S1–A2, causing a single positive 1,000 cycle per second pulse to be applied from oscillator 0–2 through the contacts of relay RY–3 to the telephone line followed by the negative 400 cycle per second pulse from oscillator 0–1, thereby signifying that the first digit of the calling number is the digit 2. During the second cycle of revolution of the rotary switch brush S1–B, positive voltage would be applied from the second stationary contact button ST–A2 of stepping relay switch ST to the stationary contact button S1–A10, causing nine positive pulses to be applied to the relay RY–3 and therefor nine 1,000 cycle per second positive pulses to be applied from oscillator 0–2 to the line, followed by a negative 400 cycle per second pulse from oscillator 0–1, thus signifying that the second digit is a 0. From this, the manner of connecting the lower and upper terminals of the terminal strip TS and its operation to generate pulse trains signifying the telephone number of the calling telephone should be apparent.

Figure 5:
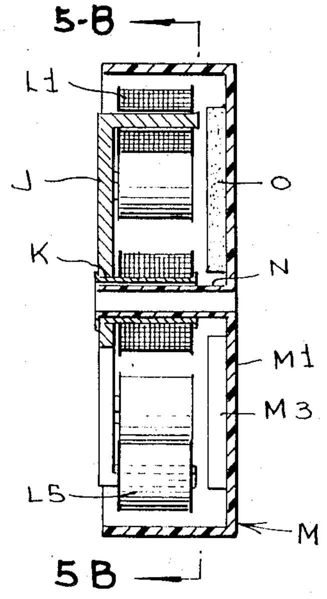
FIG. 5 is a perspective view of one of the readout number indicator cylinders to be associated with the telephone sets.
Figure 5:
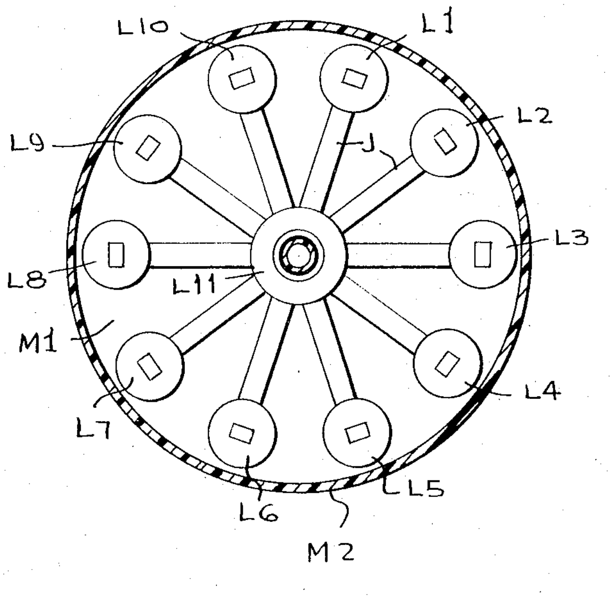
Figure 5:
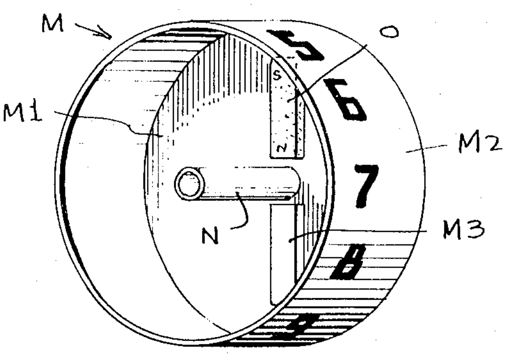

The readout number indicators, generally indicated at 12, which are provided on each telephone set 11, comprise in the illustrated embodiment a set of ten rotatable readout cylinders, indicated at M in FIGS. 5 and 5A, arranged in side-by-side relation along a common axis. The cylinders M are made preferably of a light plastic substance providing a cylindrical flange on which the numbers 0 through 9 or printed or otherwise formed. The circular wall of the cup shaped cylinder M, indicated at M1, has a center shaft N coaxial with the printed cylindrical flange M2 of the cylinder, and a small magnet 0 is fixed to the inner side of the circular wall M1 with, for example, the north magnetic pole of the magnet 0 located near the center of the cylinder M. A counterweight M3 is fixed on the circular wall M1 diametrically opposite the magnet 0 to counterbalance the weight of the magnet. Each of the readout cylinders M is journaled for rotation about its center by disposing its center shaft N within the center opening K in the spider-like support J having ten arms, at the end of each of which are provided small electromagnetic coils L1 to L10. The support J is of magnetizeable material, and the center opening K therein is formed by an integral cylindrical sleeve portion which is the core of another coil L11. In operation, the center coil L11 is energized to produce a south magnetic pole adjacent the center of the associated indicator cylinder M, and an appropriate one of the coils L1 to L10, corresponding to the number to be indicated, is excited by signals applied to the receiver 19 as hereinafter described, producing a north magnetic pole at the excited coil L1 to L10 and attracting the magnet 0 of the associated indicator cylinder M to rotate the cylinder to a position displaying the proper number at the front of the telephone set. The indicator cylinder M will assume a proper angular position with its magnet directly in front of the excited coil L1 to L10 when one of the coils is energized, and will remain in the same angular position after the current to the coils is terminated until another coil L1 to L10 is magnetized. Thus, once the coils for the ten readout units have been excited to properly position the cylinders M so as to display the calling number, the readout cylinders remain in the position indicating that number until they are shifted to new positions indicating another number when another call is initiated.

Figure 6:
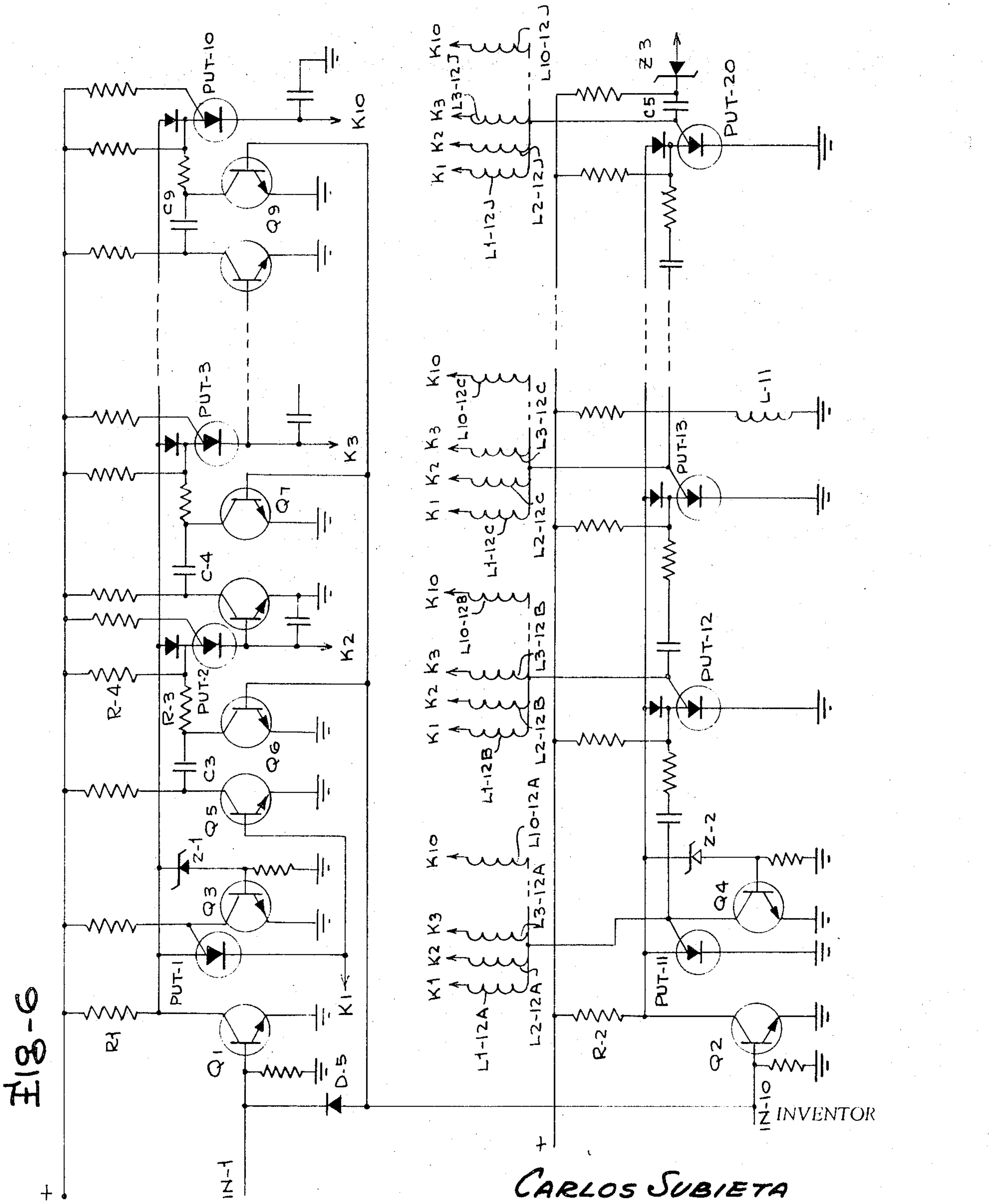
FIG. 6 is a schematic diagram of the receiver unit for activating the readout cylinders responsive to the pulse trains.
Figure 7:
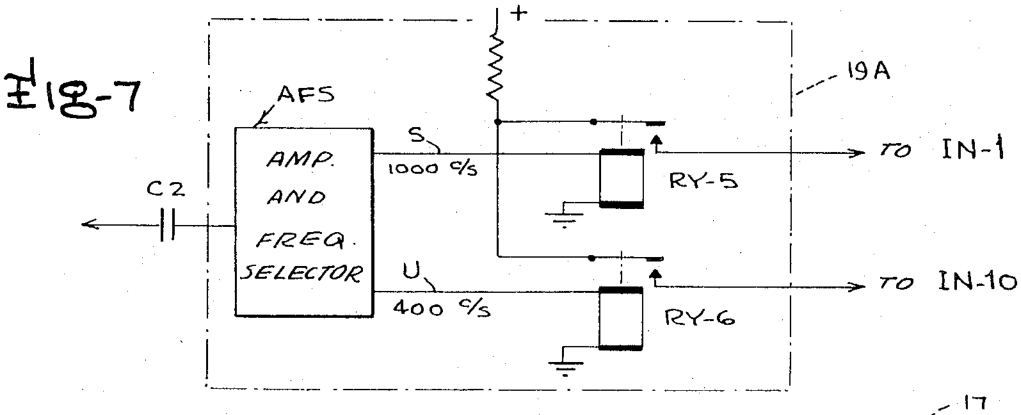
FIG. 7 is a schematic diagram of the amplifier and frequency selector circuit.

The amplifier and frequency selector unit 19A, which is indicated in FIG. 7, includes an amplifier and frequency selector stage AFS connected by a capacitor C2 to the audio line 16 of the associated receiving telephone set to couple the 1,000 cycle per second pulses and the 400 cycle per second pulses to the amplifier and frequency selector AFS, where the signals are amplified and separated and rectified. The 1,000 cycle per second pulses each produce a DC signal on the output lead S, energizing the relay RY–5, and the 400 cycle per second pulses each produce a DC output on the lower output lead U to energize the relay RY–6. The contact arms of each of the relays RY–5 and RY–6 are connected through a resistor to a positive DC source, and the stationary contacts which are engaged by the relay arms when these relays are energized are respectively connected to the IN–1 and IN–10 inputs of the receiver 19, the schematic circuit for which is illustrated in FIG. 6.

Referring to the schematic diagram of the receiver 19, illustrated in FIG. 6, the receiver is composed generally of two ring-counter circuits. The first ring-counter circuit comprises the programmable uni-junction transistors PUT–1, PUT–2, PUT–3, etc. to PUT–10 and the associated transistors such as Q1, Q3, Q5 etc., and the second ring-counter circuit is shown across the lower portion of FIG. 6 and comprises the programmable uni-junction transistors PUT–11, PUT–12, PUT–13, etc. to PUT–20 and the associated transistors and circuit elements. The programmable uni-junction transistors operate as switches and are connected with selected ones of the coils L1 to L10 of the ten readout number indicators 12 to operate them in a selected sequence. For example, all of the first coils L1 of the ten readout number indicators 12A to 12J inclusive are connected to the cathode K1 of PUT–1, as indicated in FIG. 6. Similarly, all of the second coils L2 of the ten readout indicators 12A to 12J are connected to PUT–2, and the coils L3 to L10 of the ten readout indicators are connected in like manner to the cathodes K3 to K10 of the programmable uni-junction transistors PUT–3 to PUT–10 respectively in the upper ring-counter circuit. The other ends of the ten coils L1 to L10 of the first readout indicator 12A are connected in parallel to the gate of PUT–11 in the lower ring-counter circuit, and similarly the other ends of the coils L1 to L10 of each of the other readout indicators 12B to 12J are connected in parallel to the gates of PUT–12 through PUT–20 respectively. The center coils L11 of all of the readout indicators 12A to 12J are connected in parallel between the positive DC supply to the receiver and the chassis or ground so as to have a constant flow of current as long as the receiver circuit is ON. In the operation of the receiver circuit, as soon as the receiver is placed in an ON condition by the automatic receiver control 17, as hereinafter described, the zener diode Z1 will conduct, placing a positive voltage on the base of transistor Q3 which causes this transistor to conduct, thus reducing the gate voltage or potential at PUT–1 below its anode potential and causing PUT–1 to fire. When PUT–1 fires, there is a drop of potential at the bottom of resistor R1, which turns off the zener diode Z1, and the upper ring-counter circuit remains in this condition until the first pulse is applied to the input IN–1.

Similarly, zener diode Z2 conducts as soon as positive voltage is applied to the lower ring-counter circuit, biasing transistor Q4 to an ON or conducting condition, and thus causing PUT–11 to fire in a similar manner and turn off the zener diode Z2.

As soon as both PUT–1 and PUT–11 fire, the current through the cathode K1 of PUT–1 will flow through the coil L1 of the first readout indicator 12A to the gate of PUT–11, energizing the coil L1 and causing the first readout indicator 12A to show the digit 1. In addition, the base of transistor Q5 will receive a positive potential turning ON transistor Q5, thereby causing one side of the capacitor C3 to be connected to ground and the other side to be connected to the positive supply through resistors R3 and R4, charging the capacitor C3 to a potential equal to that on the positive supply lead.

Any 1,000 cycle per second pulses received from the audio lines 16 by the amplifier and frequency selector unit 19A, before receipt of a 400 cycle per second pulse, will then apply a corresponding number of DC pulses to input IN–1. If a positive pulse appears at IN–1, the base of transistor Q1 will turn positive and this transistor will then conduct, thereby reducing the potential at the anode of PUT–1, to 0 and turning OFF PUT–1 and therefore transistor Q5. The anode of PUT–2 then receives a potential equal to that of the positive supply lead plus the discharge potential of condenser C3 through resistor R3, causing the anode potential of PUT–2 to be higher than its gate potential and turning ON PUT–2. The current through its cathode K2 then flows through the coil L2 of the first readout 12A as well as through the gate of PUT–11 to the chassis or ground, thus energizing the coil L2 of the first readout unit and causing it to display the number 2. Receipt of a second positive pulse at the input terminal IN–1 will similarly turn ON PUT–3 and cause the coil L3 of the first readout unit 12A to be excited, positioning the first readout on the number 3.

As soon as a 400 cycle per second pulse is received from the audio line 16 by the amplifier and frequency selector 19A, a positive pulse is applied to the input IN–10, turning OFF PUT–11 and turning ON PUT–12. PUT–12 is turned ON, because the condenser connected to the gate of PUT–11 acquired a charge substantially equal to the positive supply voltage while PUT–11 was conducting, and thus when PUT–11 was turned OFF, the anode of PUT–12 received a voltage equal to the sum of the charge accumulated by the condenser plus the positive supply of voltage, making its anode voltage higher than its gate voltage and causing PUT–12 to fire.

The positive pulse applied to input IN–10 also turns ON the transistors Q6, Q7, Q9 and like transistors in the top ring-counter circuit, discharging the charges accumulated on capacitors C3, C4, etc. C9. The same positive pulse applied to the input IN–10 is applied to the base of transistor Q1 through the diode D5, turning OFF any of the top ring-counter circuits which may be fired. When the positive pulse applied to IN–10 terminates, the zener diode Z1 again conducts and causes PUT–1 to fire. The current at PUT–1 then closes the circuit through its cathode K1 and the coil L1 of the second readout indicator 12B, thus causing the second readout indicator to display the digit 1. Subsequent 1,000 cycle per second pulses then cause the second readout indicator 12B to advance at the rate of one digit per pulse in the same manner as was described in connection with the operation of the top ring-counter circuit to advance the first readout indicator 12A. Each 400 cycle per second pulse received from the line 16 will cause the lower ring-counter to advance through successive stages, and cause the readout indicators 12C to 12J to be positioned to display the proper digits in a similar manner, until the tenth readout unit 12J has been positioned. As soon as the tenth readout unit 12J is properly positioned, the last pulse applied to the input IN–10 turns PUT–20 OFF. Then capacitor C5 will discharge through the zener diode Z3 and turn OFF the entire receiver.

The automatic receiver control 17 and automatic transmitter control 15, which provides the automatic circuits for turning ON and OFF the receiver 19 and transmitter 13, are shown schematically in FIG. 8, the two control circuits 15 and 17 being shown in the one figure since a transmitter control 15 and a receiver control 17 are associated with each telephone subscriber's line. It will be understood, however, that the automatic transmitter control 15 may be located at a place which is physically separated from the receiver control 17.

The automatic receiver control circuit 17 has terminals AB and AC which connect to the bell or ring lines 18 to apply signals through capacitors C6 and C7 across the coil of relay RY–7. Signals coupled through the capacitors C6 and C7 are also coupled through the diode D6 and the time delay network formed by capacitor C8 and resistor R5 to the coil of relay RY–8. Thus as soon as signals are placed on the ring line 18 of the called telephone, the relay RY–7 is activated, closing its contacts, while the normally closed contacts of relay RY–8 remain closed for a period determined by the time delay imposed by resistor R5 and capacitor C8. This causes one side of the 115 volt AC line to be connected through the contacts of relays RY–7 and RY–8 to the coil of relay RY–9, the other end of which is connected through the contact of relay RY–10 to the other side of the AC line. The relay RY–9, when thus energized, closes its contacts, including the latching contacts indicated at AD which then retain the coil of relay RY–9, in energized condition independently of the relays RY–7 and RY–8. The closure of contacts AE of relay RY–9 connect the AC supply line to the primary of transformer T1 of the power supply for the receiver 19. Also, the closure of the contacts AF of relay RY–9 arm the receiver 19 by connecting the positive DC voltage supply to the two positive supply leads indicated at the top of the two ring-counter circuits shown in FIG. 6.

As soon as the receiver has been thus turned ON, the receiver responds to the pulse trains generated by the transmitter 13 of the calling telephone applied to the amplifier and frequency selector 19A associated with the receiver and thus producing positive pulses on the inputs IN–1 and IN–10, to position the 10 readout indicators 12A to 12J, as previously described, so as to display the telephone number of the calling party. When the ten readout indicators have been positioned, and PUT–20 of the associated receiver turns OFF, the capacitor C5 is discharged through the zener diode Z3 which is connected to the coil of relay RY–10 in the receiver control 17, energizing this relay and opening its normally closed contacts to interrupt the connection from the coil of relay RY–9 to the AC supply line to deenergize that relay and turn OFF the receiver.

The automatic transmitter control circuit 15 associated with each subscriber telephone set has terminals AG and AH connected to the audio lines 16 for applying signals on the audio line caused responsive to energizing the bell of the called number to be passed through capacitors C9 and C10 to the amplifier and rectifier circuit AR. The output from the amplifier rectifier is connected to the coil of relay RY–11 to energize this relay, and is also connected in parallel with the diode D7 and the time delay network formed by capacitor C11 and resistor R6 to the coil of relay RY–12. When the ringing of the bell of the called telephone produces signals in the audio line 16 of the calling telephone, the signal through the capacitors C9 and C10, amplified and rectified by the amplifier-rectifier AR, will energize the relay RY–11, closing its contacts and applying line voltage through the still closed, normally closed contacts AL of relay RY–12 to the coil of relay RY–13. The other end of coil RY–13 is connected to the other side of the AC line through contacts AM of relay RY–12, energizing relay RY–13 and latching it in energized condition by closure of its self-latching contacts AI. Contacts AK of relay RY–13 completes the AC supply to the primary of transformer T1, and contacts AJ of relay RY–13 complete the AC supply to the primary of transformer T2. In this condition, transformer T1 works only with the transmitter, providing the power supply circuit illustrated in FIG. 3, since the positive for the receiver is interrupted at the open contacts AF of the relay RY–9 of the calling party's receiver control circuit 17. The energizing of relay RY–13 and closure of its relay contacts AJ complete the supply to the motor E of the calling number transmitter 13 associated with the calling telephone, and as soon as the motor E moves the rotating brush S1–B off of the stationary contact button S1–A12, relay RY–4 assumes the deenergized condition wherein its contacts close and relay RY–13 remains energized until the rotary switch S1 has completed its ten cycles of revolution and the brush S1–B again engages the contact button S1–A12 with the rotary brush ST–B of the stepping relay switch returned to the one position engaging the button ST–A1, whereupon relay RY–4 is again energized to break the supply circuit to relay RY–13.

Audio signals at the terminals AG and AH do not matter, because the time delay relay RY–12 will remain with its contacts in open condition, once it has been energized, until after a predetermined period of absence of audio frequencies, in which case it will close its contacts after the predetermined time delay period.

What is claimed is:

1. A calling number identifying system for use with subscriber's telephones in a telephone system to automatically display at a called party's telephone set the telephone number of a calling party, comprising calling number transmitter means associated with subscriber's telephones operative through a full cycle upon activation thereof to generate and apply to a calling party's telephone lines a signal pulse train distinctively identifying the calling party's assigned telephone number, number display readout means for the subscriber's telephones to visually display telephone numbers in proximity to the telephones of called parties, identifier-signal receiver means for the telephones coupled to a called party's telephone lines and to said readout means to operate the associated readout means to display at a called telephone the telephone number signified by the signal pulse train identifying a calling party, and control means coupled to the telephone lines and responsive to circuit interconnection of a calling telephone and called telephone to activate the transmitter means for the calling telephone to generate and transmit its signal pulse train and to activate the identifier-signal receiver means of the called telephone to respond to the transmitted signal pulse train and operate the associated readout means to display the calling party's telephone number, said transmitter means including means for producing a pulse of a first type for each digit of the calling party's telephone number signifying completion of the signalling of the number for such digit, means for producing pulses of a second type having a selected numerical relationship to the numerals in said digits, and means for applying to the telephone lines of the calling party's telephone selected numbers of said pulses of the second type preceding said pulses of the first type to produce said signal pulse train.

2. A calling number identifying system as defined in claim 1, wherein said control means includes means coupled to the audio lines of the associated calling party telephone responsive to audio line signals signifying ringing of the called party telephone to activate the transmitter means to generate and transmit its signal pulse train.

3. A calling number identifying system as defined in claim 2, wherein said receiver includes a first ring-counter circuit and a second ring-counter circuit having said readout means coupled between selected stages of the first and second ring-counter circuits, and means for applying pulses to said first ring-counter circuit responsive to said first type pulses and for applying pulses to said second ring-counter circuit responsive to said second type pulses for operating the readout means to display the numerals making up the digits of the calling party's telephone number.

4. A calling number identifying system as defined in claim 1, wherein said control means includes means, coupled to selected lines of the associated telephone to which ringing signals are applied, operative responsive to ring signals on said selected lines to activate the receiver means connected therewith for responding to said signal pulse train thereafter applied to the telephone lines of the associated telephone and operating the readout means for displaying the calling party telephone number signified by the pulses.

5. A calling number identifying system as defined in claim 4, wherein said receiver includes a first ring-counter circuit and a second ring-counter circuit having said readout means coupled between selected stages of the first and second ring-counter circuits, and means for applying pulses to said first ring-counter circuit responsive to said first type pulses and for applying pulses to said second ring-counter circuit responsive to said second type pulses for operating the readout means to display the numerals making up the digits of the calling party's telephone number.

6. A calling number identifying system as defined in claim 1, wherein said receiver means comprises an input section including amplifier and frequency selector and associated relays responsive to the pulses making up the signal pulse train applied to the telephone lines of the calling party and transmitted to the called party's telephone lines for producing D.C. pulses distinctively representing the pulses of the signal pulse train to activate portions of said receiver means operating said readout means.

7. A calling number identifying system as defined in claim 1, wherein said receiver includes a first ring-counter circuit and a second ring-counter circuit having said readout means coupled between selected stages of the first and second ring-counter circuits, and means for applying pulses to said first ring-counter circuit responsive to said first type pulses and for applying pulses to said second ring counter circuit responsive to said second type pulses for operating the readout means to display the numerals making up the digits of the calling party's telephone number.

8. A calling number identifying system for use with subscriber's telephones in a telephone system to automatically display at a called party's telephone set the telephone number of a calling party, comprising calling number transmitter means associated with subscriber's telephones operative through a full cycle upon activation thereof to generate and apply to a calling party's telephone lines a signal pulse train distinctively identifying the calling party's assigned telephone number, number display readout means for the subscriber's telephones to visually display telephone numbers in proximity to the telephones of called parties, identifier-signal receiver means for the telephones coupled to a called party's telephone lines and to said readout means to operate the associated readout means to display at a called telephone the telephone number signified by the signal pulse train identifying a calling party, and control means coupled to the telephone lines and responsive to circuit interconnection of a calling telephone and called telephone to activate the transmitter means for the calling telephone to generate and transmit its signal pulse train and to activate the identifier-signal receiver means of the called telephone to respond to the transmitted signal pulse train and operate the associated readout means to display the calling party's telephone number, said transmitter means including first means for producing a first type pulse of a first selected frequency for each digit of the telephone number of the associated telephone, second means for producing second type pulses of a second selected frequency wherein the second type pulses bear a selected numerical relationship to the numerals in the respective digits, and switch means cycled automatically through a complete sequence upon activation of the transmitter means to apply to the associated telephone lines combinations of said second type pulses and first type pulses identifying the numerals for each of the digits of the calling party's telephone number.

9. A calling number identifying system as defined in claim 8, wherein said control means includes means coupled to the audio lines of the associated calling party telephone responsive to audio line signals signifying ringing of the called party telephone to activate the transmitter means to generate and transmit its signal pulse train.

10. A calling number identifying system as defined in claim 28, wherein said control means includes means, coupled to selected lines of the associated telephone to which ringing signals are applied, operative responsive to ring signals on said selected lines to activate the receiver means connected therewith for responding to said signal pulse train thereafter applied to the telephone lines of the associated telephone and operating the readout means for displaying the calling party telephone number signified by the pulses.

11. A calling number identifying system as defined in claim 8, wherein said receiver includes a first ring-counter circuit and a second ring-counter circuit having said readout means coupled between selected stages of the first and second ring-counter circuits, and means for applying pulses to said first ring-counter circuit responsive to said first type pulses and for applying pulses to said second ring-counter circuit responsive to said second type pulses for operating the readout means to display the numerals making up the digits of the calling party's telephone number.

* * * * *